Figure 1:
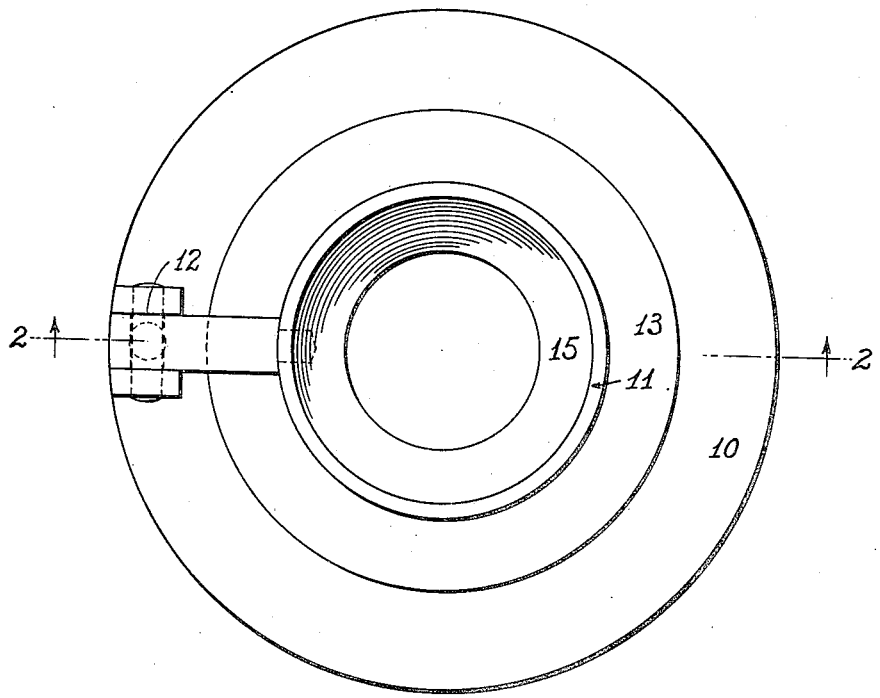

Oct. 8, 1940.   J. T. LEDBETTER   2,217,175
METHOD OF TESTING DRILLING FLUID
Filed Aug. 20, 1938

INVENTOR.
Jerry T. Ledbetter
BY Philip Lubkow
ATTORNEY.

Patented Oct. 8, 1940

2,217,175

UNITED STATES PATENT OFFICE 2,217,175

METHOD OF TESTING DRILLING FLUID

Jerry T. Ledbetter, Compton, Calif., assignor to Union Oil Company of California, Los Angeles, Calif., a corporation of California Application August 20, 1938, Serial No. 225,954

5 Claims. (Cl. 73—51)

This invention relates to a method for determining the relative qualities of drilling fluids, particularly the relative ability of drilling muds to prevent loss of water to formations being drilled.

In the rotary method of drilling wells, such as deep oil wells, a circulating drilling fluid is usually employed comprising an aqueous suspension of finely divided clayey or bentonitic solids. During such drilling operations the drilling mud, while under the great hydrostatic heads within the depths of the well bore, tends to lose water to the penetrated earth formations by infiltration. Certain types of earth formations, such as those known as "heaving shales" while sufficiently rigid when dry, lose a large portion of their mechanical strength when wetted by contact with such water infiltration from the drilling mud which results in caving and often in the consequential sticking of drilling tools and in extreme cases even the loss of the well. Moreover, producing sands penetrated by the drill, if they absorb much water from the drilling mud, may also be injured with respect to their subsequent production rates.

The quality of drilling muds, as is known, can be adjusted and often improved with respect to their abilities to prevent loss of water to the penetrated formations by adding colloidal material or by various chemical treatments. The proper treatment of such drilling muds can only be made with the aid of suitable testing methods and devices to indicate when such treatments are necessary initially and what improvements in characteristics have been effected thereby. One such method has been a simple filtration test whereby a measured quantity of drilling mud has been subjected to pressure filtration through a standard filter paper under standardized conditions. The quantity of water passing through the filter in a given length of time has been taken as indicative of the quality of the mud with respect to its tendency to lose water to the formations.

The object of this invention is to provide a new and improved method for determining the ability of drilling mud to prevent loss of water to formations being drilled.

Accordingly, I have discovered that there is a general relationship between the ability of a mud to prevent loss of water to formations and the rapidity with which water is withdrawn from such mud by porous materials, such as filter paper, that contain large numbers of fine capillary passages. The slower the rate at which water is withdrawn from the mud the greater is the ability of the mud to prevent loss of water to penetrated formations.

My invention, therefore, resides in a method for subjecting muds to contact with porous absorbent material under standardized conditions and for observing the relative rates with which the water is withdrawn from such muds by the said absorbent material, whereby the relative formation penetration characteristics of the drilling fluids can be determined.

Figure 2:
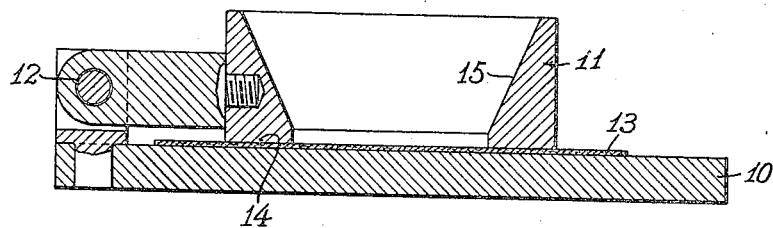

A preferred embodiment of the apparatus of my invention is illustrated in the drawing, of which Fig. 1 is a plan view and Fig. 2 a sectional elevation taken at line 2—2 of Fig. 1.

Referring to the drawing, 10 is a flat metal base plate upon which a ring 11 is adapted to rest. The said ring 11, for convenience, is attached to the edge of the base plate 10 by means of a suitable hinged connection 12 which allows the said ring 11 to be raised from the upper surface of the base 10 a distance sufficient to allow the insertion of a filter paper therebetween which is shown in position at 13. The ring 11, when in operating position as shown, makes a firm and uniform contact at its lower end 14 with the surface of the filter paper 13.

The outside surface of the ring 11 is cylindrical in shape while the inside surface 15 takes the form of a truncated cone having its minimum diameter at the bottom near the point of contact with the filter paper 13.

In operation, the inner truncated cone shaped portion of the ring 11, which is closed at the bottom end by the base plate 10 and the filter paper 13, serves as a cup-shaped reservoir to contain drilling mud which is to be tested to determine its tendency to lose water to penetrated formations.

In making a test of a given specimen of drilling mud a filter paper as shown at 13, is laid on the upper surface of the base 10 and the cylinder is lowered until it rests uniformly upon the filter paper, as hereinbefore described. The cone shaped reservoir is then filled to the top with the mud to be tested. Upon contact of the mud with the filter paper at the bottom of the reservoir, water is withdrawn therefrom into the filter paper and produces thereby a disc shaped area of water-saturated filter paper which gradually increases from its initial diameter from the inner boundaries of the lower end of the truncated conical reservoir as water continues to be withdrawn from the mud sample, until the outer edge of the said disc shaped water-wet area appears beyond the outer wall of the cylinder 11. The time required after the introduction of the mud into the cylinder for this ring of absorbed water to make its appearance at the outer edge is noted and used to evaluate formation penetration characteristics of the mud.

Suitable dimensions for the ring 11 have been found to be one and one-quarter inches outside diameter, three quarter inch minimum inside diameter and a length of one-half inch. The base 10 and other portions of the apparatus may have any suitable size or shape without effecting the operation of the device.

With the testing device constructed with the above given dimensions it has been found that if the mud being tested is of poor quality the water will appear in the filter paper at the outer edge of the ring in twenty seconds or less. If the mud is of only fair quality the wetted disc will appear in twenty to forty seconds. With a mud of relatively good quality it will appear in forty to eighty seconds and a superior mud will require eighty seconds or more for its appearance.

The advantages of this invention reside in the simplicity of the method of test which does not require accurately controlled pressure to be imposed upon the mud sample and in the simplicity and portability of the apparatus employed for making such tests.

The utility of the method of this invention is not limited to testing drilling muds but it extends to the measurement of the penetration characteristics of drilling fluids in general whether comprising aqueous or oily suspensions of formation sealing substances and it also extends to the measurement of the filtration characteristics of liquids in general.

The foregoing is merely illustrative of one apparatus and method and the invention is not limited thereby but may include any method and apparatus which accomplishes the same within the scope of the claims.

I claim:

1. A method of testing drilling fluid to determine its ability to prevent loss of liquid to the penetrated formation comprising contacting a unit area of a given porous body containing a large number of capillary passages with a fluid to be tested and measuring the rate of liquid absorption into said porous body.

2. A method of testing drilling fluid to determine its ability to prevent loss of liquid to the penetrated formation comprising contacting a unit area of a relatively thin sheet of absorbent material with a quantity of drilling fluid and measuring the rate of increase of the wetted area of the absorbent sheet caused by the absortion of liquid from said drilling fluid.

3. A method according to claim 1 in which the absorbent material is a standard filter paper.

4. A method according to claim 8 in which the absorbent material is a standard filter paper.

5. A method of testing drilling fluid to determine its ability to prevent loss of liquid to penetrated formations comprising contacting a unit area of a given porous body containing a large number of capillary passages with the fluid to be tested and measuring the lineal rate of movement of the boundary between the wetted and unwetted portion of the said porous body caused by the absorption of liquid from said fluid.

JERRY T. LEDBETTER.

CERTIFICATE OF CORRECTION.

Patent No. 2,217,175. October 8, 1940.

JERRY T. LEDBETTER.

It is hereby certified that error appears in the printed specification of the above numbered patent requiring correction as follows: Page 2, second column, line 24, claim 4, for the claim reference numeral "8" read --2--; and that the said Letters Patent should be read with this correction therein that the same may conform to the record of the case in the Patent Office.

Signed and sealed this 18th day of March, A. D. 1941.

(Seal)

Henry Van Arsdale,
Acting Commissioner of Patents.